US008350406B2

(12) United States Patent
Byrne et al.

(10) Patent No.: US 8,350,406 B2
(45) Date of Patent: Jan. 8, 2013

(54) ELECTRICAL SYSTEM WITH CIRCUIT LIMITER

(76) Inventors: Norman R. Byrne, Ada, MI (US); Timothy J. Warwick, Sparta, MI (US); Shawn R. Gibson, Fremont, MI (US)

( * ) Notice: Subject to any disclaimer, the term of this patent is extended or adjusted under 35 U.S.C. 154(b) by 0 days.

(21) Appl. No.: 13/449,701

(22) Filed: Apr. 18, 2012

(65) Prior Publication Data

US 2012/0261988 A1 Oct. 18, 2012

Related U.S. Application Data

(60) Provisional application No. 61/476,613, filed on Apr. 18, 2011.

(51) Int. Cl.
*H02J 3/14* (2006.01)

(52) U.S. Cl. ........................................................ 307/38

(58) Field of Classification Search .................... 307/35, 307/38, 39, 116

See application file for complete search history.

(56) References Cited

U.S. PATENT DOCUMENTS

| | | | |
|---|---|---|---|
| 3,214,734 | A | 10/1965 | Whitehead |
| 3,339,079 | A | 8/1967 | Kessler |
| 3,766,434 | A | 10/1973 | Sherman |
| 3,813,579 | A | 5/1974 | Doyle et al. |
| 3,993,977 | A | 11/1976 | Gilbert |
| 4,023,073 | A | 5/1977 | Georgi |
| 4,161,727 | A | 7/1979 | Thilo et al. |
| 4,175,238 | A | 11/1979 | Breimesser et al. |
| 4,370,562 | A | 1/1983 | Palazzetti et al. |
| 4,499,385 | A | 2/1985 | Slavik |
| 4,520,417 | A | 5/1985 | Frank |
| 4,575,714 | A | 3/1986 | Rummel |
| 4,720,758 | A | 1/1988 | Winslow |
| 4,731,549 | A | 3/1988 | Hiddleson |
| 4,760,276 | A | 7/1988 | Lethellier |
| 5,083,042 | A | 1/1992 | Merchant |
| 5,157,273 | A | 10/1992 | Medendorp et al. |

(Continued)

FOREIGN PATENT DOCUMENTS

JP 7221581 8/1995

(Continued)

OTHER PUBLICATIONS

Power Integrations, Inc., “Tiny Switch Flyback Design Methodology—Application Note AN-23,” dated Jul. 1999.

(Continued)

*Primary Examiner* — Carlos Amaya

(74) *Attorney, Agent, or Firm* — Gardner, Linn, Burkhart & Flory, LLP

(57) ABSTRACT

An electrical power distribution system automatically limits the number of substantially similar or identical power cable assemblies that are electrically energizable from a power source. A control unit is connected between the power source and the power cable assemblies, and limits the number of power cable assemblies that can be energized in the system by sensing the voltage in a sensing circuit. An applied voltage in the sensing circuit changes in a predictable manner corresponding to the number of power cable assemblies that are electrically connected in the circuit. Each power cable assembly includes an impedance element that is added to the sensing circuit when the corresponding power cable assembly is coupled to the system, and once the detected voltage is beyond a predetermined threshold value, the control unit will ensure that the power cable assemblies are not energized by the power source.

20 Claims, 5 Drawing Sheets

U.S. PATENT DOCUMENTS 5,164,609 A 11/1992 Poppe et al.
5,164,916 A 11/1992 Wu et al.
5,172,008 A 12/1992 Odagiri
5,203,711 A 4/1993 Bogiel
5,203,712 A * 4/1993 Kilpatrick et al. ............ 439/215
5,208,485 A 5/1993 Krinsky et al.
5,270,576 A 12/1993 Kahle
5,359,540 A 10/1994 Ortiz
5,424,903 A 6/1995 Schreiber
5,436,788 A 7/1995 Wallaert
5,575,668 A 11/1996 Timmerman
5,589,718 A 12/1996 Lee
5,604,385 A 2/1997 David
5,621,256 A 4/1997 Crane et al.
5,637,933 A 6/1997 Rawlings et al.
5,644,461 A 7/1997 Miller et al.
5,684,469 A 11/1997 Toms et al.
5,691,750 A 11/1997 Edwards
5,708,551 A 1/1998 Bosatelli
5,708,554 A 1/1998 Liner
5,745,670 A 4/1998 Linde
5,754,384 A 5/1998 Ashley
5,781,744 A 7/1998 Johnson et al.
5,815,353 A 9/1998 Schwenkel
5,855,494 A 1/1999 Blaszczyk et al.
5,885,109 A 3/1999 Lee et al.
5,914,539 A 6/1999 Borgmann et al.
5,923,103 A 7/1999 Pulizzi et al.
5,967,820 A 10/1999 Siegal et al.
6,028,267 A 2/2000 Byrne
6,031,302 A 2/2000 Levesque
6,046,513 A 4/2000 Jouper et al.
6,049,143 A 4/2000 Simpson et al.
6,157,555 A 12/2000 Hemena et al.
6,179,665 B1 1/2001 Rossman et al.
6,211,796 B1 4/2001 Toms et al.
6,290,518 B1 9/2001 Byrne
6,356,826 B1 3/2002 Pohjola
6,366,927 B1 4/2002 Meek et al.
6,379,164 B1 4/2002 Cash, Jr.
6,385,547 B1 5/2002 Bogli
6,417,657 B2 7/2002 Azuma et al.
6,420,877 B1 7/2002 Replogle
6,428,334 B1 8/2002 Skarie et al.
6,469,404 B1 10/2002 Pohjola
6,624,991 B2 9/2003 Chu
6,633,434 B2 10/2003 Hollander
6,633,472 B2 10/2003 Lai
6,660,950 B2 12/2003 Fonseca
6,786,765 B2 9/2004 Bauermeister et al.
6,815,842 B2 11/2004 Fehd et al.
6,857,896 B2 2/2005 Rupert et al.
7,058,482 B2 6/2006 Fletcher et al.
7,075,769 B2 7/2006 Rupert et al.
7,141,891 B2 11/2006 McNally et al.
7,641,510 B2 1/2010 Byrne
7,905,737 B2 3/2011 Byrne
2007/0086126 A1 4/2007 Baxter
2007/0184696 A1 8/2007 Melot et al.
2008/0160810 A1 7/2008 Ferguson et al.
2009/0091192 A1 4/2009 Robertson et al.
2010/0020452 A1 1/2010 Gandolfi

FOREIGN PATENT DOCUMENTS

WO 2006009672 A1 1/2006

OTHER PUBLICATIONS

Microchip Technology, Inc., "PIC12F675 Data Sheet" located at http://www.microchip.com/wwwproducts/Devices.aspx?dDocName=en010114, dated Apr. 30, 2010.

Excerpt of UL Household and Commercial Furnishings Standard 962, dated Jun. 11, 2010.

* cited by examiner 28
52
32
22b
26
22a
24
22
20
12
38
40
34
36
14
16
Power Source

10

HOT
GROUND
NEUTRAL
110 VAC
5V POWER SUPPLY
SENSE LINES
5 VDC

ELECTRICAL SYSTEM WITH CIRCUIT LIMITER

CROSS-REFERENCE TO RELATED APPLICATION

The current application claims the benefit of U.S. provisional application Ser. No. 61/476,613, filed Apr. 18, 2011, which is hereby incorporated herein by reference in its entirety.

FIELD OF THE INVENTION

The present invention relates to electrical systems for interconnecting modular energy assemblies in tandem, or ganged, and more particularly, to an electrical system for limiting the number of interconnected modular energy assemblies that can be operatively connected to one another.

BACKGROUND OF THE INVENTION

Efficient organization of devices requiring electrical power within an office, commercial, industrial or residential environment has been a historical problem. Such devices include lamps, typewriters, computers, printers, complex telephone stations, video displays, and the like. The primary problems associated with the efficient organization and use of such devices relate to the abundance of wiring arrays and the positioning of the energy requiring devices within the environment.

With increased use of personal computers in the office environment, many furniture articles have been modified to accommodate the proliferation of electrical cables associated with these computers. The task of wire management has become more troublesome, yet more essential. Many furniture systems have been developed that provide some means for storing or containing the various cables and wires associated with the computer system, as well as with other electrical equipment that may be supported by an article of furniture such as a desk.

A somewhat more of a unique problem arises in the case of ganged or interconnected furniture. For example, in conference and training room settings, a number of tables can be connected or ganged together in a particular arrangement. In a training setting, several trainees may be seated around an array of tables, each trainee having his or her own computer for performing various training tasks. Similarly, in a conference room setting, the attendees may likewise require their own computer monitors at their particular locations at the table arrangement.

With this type of ganged furniture, problems arise as to how to provide electrical power to each of the computers throughout the length of the connected furniture. One approach is to provide each workstation or conference table location with an electrical cable connected directly to an outlet. However, in many conference or training rooms, there are not enough wall outlets to accommodate the number of participants. A further option that has been pursued is the utilization of a series of power strips. Such strips include multiple electrical outlets connected to single power cord. The power cord, in turn, is plugged into a wall socket. A substantive approach is advantageous in reducing the necessary number of wall plug-ins. That is, a typical power strip may have four to eight electrical sockets. However, even with such a configuration, and in a conference room setting where there are a dozen or more participants, several power strips would be required. The number of power strips may still exceed in the number of available wall outlets. Still further, even if there are a sufficient number of wall outlets, the use of multiple power strips can still lead to a tangled mass of electrical cables.

Unfortunately, some users may be tempted to improperly "daisy-chain" a set of power strips together. That is, each power strip can be connected to a prior power strip, with is ultimately connected to a single wall socket. Such use of a power strip is often in violation of certain regulatory standards, as well as the recommendations of the manufactures of power strips. Notwithstanding the safety hazards, the daisy-chaining of power strips still presents problems in wire management.

SUMMARY OF THE INVENTION

The present invention provides an electrical power distribution system in which a plurality of power cable assemblies may be electrically connected to a power source via a control unit that automatically limits the number of power cable assemblies that can be energized in the system. This is accomplished by way of a voltage sensing circuit in which the applied voltage will drop in a predictable or known manner that corresponds to the number of power cable assemblies that are electrically connected in the circuit. Once the detected number of power cable assemblies equals or exceeds a predetermined threshold number (corresponding to a predetermined voltage drop in the sensing circuit), the control unit will ensure that the power cable assemblies are not energized by the power source.

According to one aspect of the invention, an electrical power distribution system includes at least one power outlet receptacle, at least one power cable assembly, and a control unit. The power cable assembly includes (i) a main power cable subassembly having at least two power conductors, at least two signal conductors, and a pair of electrical connectors at opposite end portions of the main power cable subassembly, (ii) an electrical impedance element that is electrically coupled to at least one of the signal conductors, and (iii) an outlet feed cable configured to be electrically coupled to the power outlet receptacle and to the power conductors in the main power cable sub assembly. The control unit is in electrical communication with the power conductors and the signal conductors of the main power cable subassembly, and includes an electrical switch along at least one of the power conductors. The switch is controlled to selectively prevent a flow of electricity through the power conductors. A controller in electrical communication with the signal conductors and the electrical switch is operable to detect a number of main power cable subassemblies that are coupled together in the electrical power distribution system by measuring a voltage in the signal conductors. The control unit is operable close the electrical switch so as to permit a flow of electricity through the power conductors when the number of main power cable subassemblies in the electrical power distribution system is detected by the controller.

Optionally, the electrical impedance element is electrically coupled across the signal conductors so that when the electrical power distribution system includes a plurality of main power cable subassemblies electrically coupled in series, the electrical impedance elements are electrically coupled in parallel. In this arrangement, the electrical resistance across the signal conductors is reduced as the total number of main power cable subassemblies and electrical impedance elements is increased.

Optionally, the electrical impedance element is electrically coupled along only one of the signal conductors so that when the electrical power distribution system includes a plurality of the main power cable subassemblies electrically coupled in series, the electrical impedance elements are also electrically coupled in series. In this arrangement, the electrical resistance across the signal conductors is increased as the total number of main power cable subassemblies and electrical impedance elements is increased.

Optionally, the main power cable subassembly includes at least three power conductors including a line conductor, a neutral conductor, and a ground conductor.

Optionally, the electrical impedance element includes an electrical resistor.

Optionally, the electrical impedance element is disposed in one of the first and second electrical connectors of the main power cable subassembly.

Optionally, the controller includes an electrical converter in electrical communication with the at least two power conductors and with the signal conductors, the electrical converter for converting a relatively higher voltage electrical power to a relatively lower voltage electrical power that is applied to the signal conductors.

Optionally, the outlet feed cable includes at least two power feed conductors that are electrically coupled to respective ones of the power conductors of the main power cable subassembly at the first electrical connector. Optionally, the outlet feed cable does not include any electrical conductors in communication with the signal conductors of the main power cable subassembly.

Optionally, the power outlet receptacle is a pop-up power outlet receptacle that is configured to be supported in a recess at a work surface.

Optionally, the first electrical connector is configured to mechanically and electrically couple the at least two power conductors and the signal conductors of a first of the main power cable subassemblies with the at least two power conductors and the signal conductors at the second electrical connector of a second of the main power cable subassemblies.

Optionally, the control unit includes first and second power outfeed cables, each of which includes a plurality of power outfeed conductors and at least two outfeed signal conductors that are simultaneously electrically connectable to respective power conductors and signal conductors of a different power cable assembly.

Therefore, the present invention provides an electrical power distribution system that may be implemented along a work surface or other area where multiple power outlet receptacles are desired, but which will automatically not energize any of the power outlet receptacles if too many power cable assemblies are connected together in a single circuit. This substantially limits or prevents the chance of a power overload condition, or of too many electrical contact connections being made in a single circuit, while still allowing for the convenience of substantially identical or universal or interchangeable power cable assemblies.

These and other objects, advantages, purposes, and features of the present invention will become more apparent upon review of the following specification in conjunction with the drawings.

DESCRIPTION OF THE PREFERRED EMBODIMENTS

Figures 1, 2:
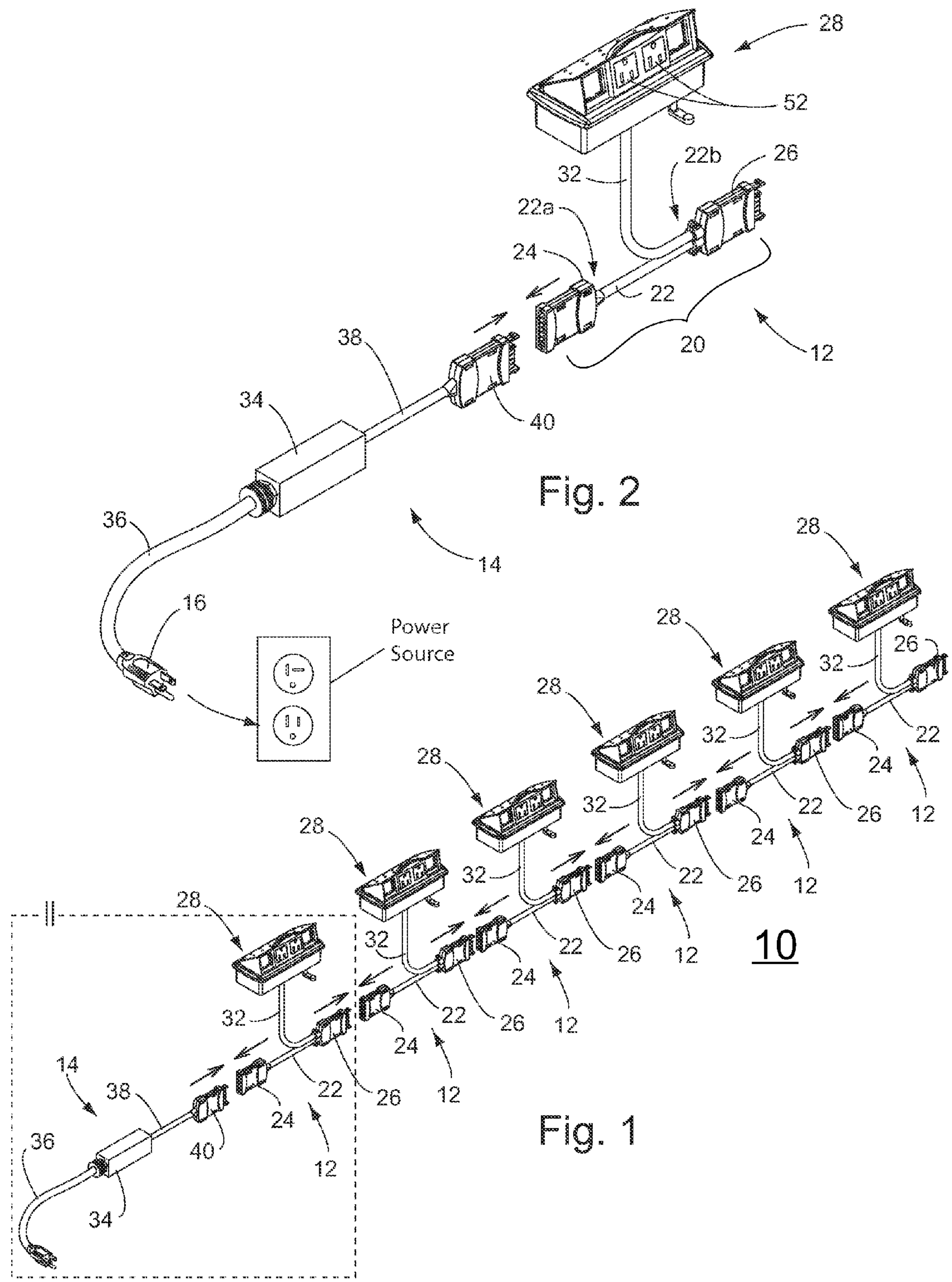
FIG. 1 is a perspective view of an electrical distribution system incorporating circuit limitation in accordance with the present invention.
FIG. 2 is an enlarged perspective view of the control unit and a single power cable assembly taken from the region designated II in FIG. 1.
Figure 3:
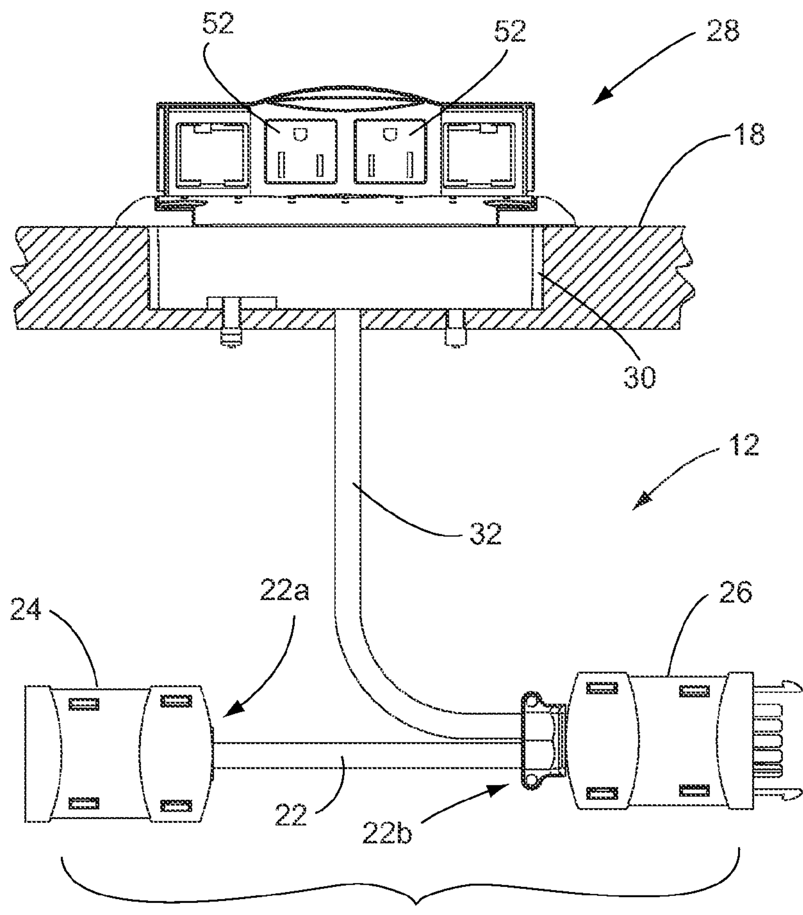
FIG. 3 is a side elevation of the single power cable assembly of FIG. 2, shown with its power outlet module positioned at a work surface.

Referring now to the drawings and the illustrative embodiments depicted therein, an electrical power distribution system 10 includes a plurality of generally Y-shaped power cable assemblies 12 that are electrically connectable together in series, and which receive electrical power via a control unit 14 and direct this power to respective branch cables and a power outlets (FIGS. 1 and 2). Control unit 14 receives electrical power through a plug 16 that is connectable to a wall outlet or other electrical power source (FIG. 2), and is operable to selectively conduct the electrical power to the power cable assemblies 19 depending on the number of power cable assemblies that are coupled together in the electrical power distribution system 10, as will be described in greater detail below. In this way, each power cable assembly 12 can be substantially identical to the other power cable assemblies, and the system 10 can de-energize (or not energize) the power cable assemblies 12 in the event that more than a predetermined number of power cable assemblies 12 are electrically coupled together. Power cable assemblies 12 may be positioned at a work surface 18 (FIG. 3), such as of a substantially horizontal desk, table, workstation, or the like, and used to supply electrical power to computers, telephones and other communications equipment, lighting, or substantially any other electrical power consumers or appliances. It is envisioned that the wiring associated with each power cable assembly 12 may be positioned behind the work surface 18 so as to be relatively unobtrusive or obscured, such as below the work surface as shown in FIG. 3. However, it is further envisioned that the wiring associated with each power cable assembly 12 may be arranged in a more visible location, such as along an upper surface of the work surface, without departing from the spirit and scope of the present invention.

Each power cable assembly 12 includes a main power cable assembly or subassembly 20 having a main power cable 22 with opposite end portions 22*a*, 22*b*, a first or upstream connector 24 at the first end portion 22*a* and a second or downstream connector 26 at the second end portion 22*b* (FIGS. 1-3). Suitable connectors 24, 26 are available from Byrne Electrical Specialists, Inc. of Rockford, Mich. Each power cable assembly 12 further includes a branch cable or outlet feed cable 32 that is electrically and mechanically connected to main power cable subassembly 20, such as at downstream connector 26. However, it is envisioned that outlet feed cable 32 could be connected to the upstream connector 24 or directly to the power cable 22.

A power outlet module 28 is connectable to the opposite end portion of outlet feed cable 32 and, in the illustrated embodiment, power outlet module 28 is a pop-up power outlet unit configured to be mounted in a recess or opening 30 that is formed or established in work surface 18 (FIG. 3). However, it will be appreciated that substantially any electrical power connector, socket, or the like may be provided at the end of outlet feed cable 32, without departing from the spirit and scope of the present invention. Power outlet modules 28 may provide receptacles or jacks for supplying electrical power and/or data, such as those available from Byrne Electrical Specialists, Inc. of Rockford, Mich., and may be substantially similar to those described in any of commonly-owned U.S. Pat. Nos. 5,575,668; 6,028,267; and 6,290,518, the disclosures of which are hereby incorporated herein by reference. It will be appreciated that main power cables 20 and outlet feed cables 32 may be substantially any desired length, without departing from the spirit and scope of the present invention.

Control unit 14 includes a controller 34 that receives electrical power via a power infeed cable 36 having plug 16 at an opposite end thereof (FIGS. 1, 2, 5, and 6). A power outfeed cable 38 selectively receives electrical power from infeed cable 36 (via control unit 14) when the number of power cable assemblies 12 coupled to control unit 14 is determined (by controller 34) to be at or below a predetermined maximum number. Power outfeed cable 38 supplies electrical power to power cable assemblies 12 via a power outfeed connector 40, which may be substantially similar or identical to downstream connector 26, and which is mechanically and electrically connectable to the upstream connector 24 of one of the power cable assemblies 12. Additional or subsequent or downstream power cable assemblies 12 may be electrically and mechanically connected together in series or in a "daisy-chain" or tandem manner, such as shown conceptually in FIG. 1.

Figure 6:
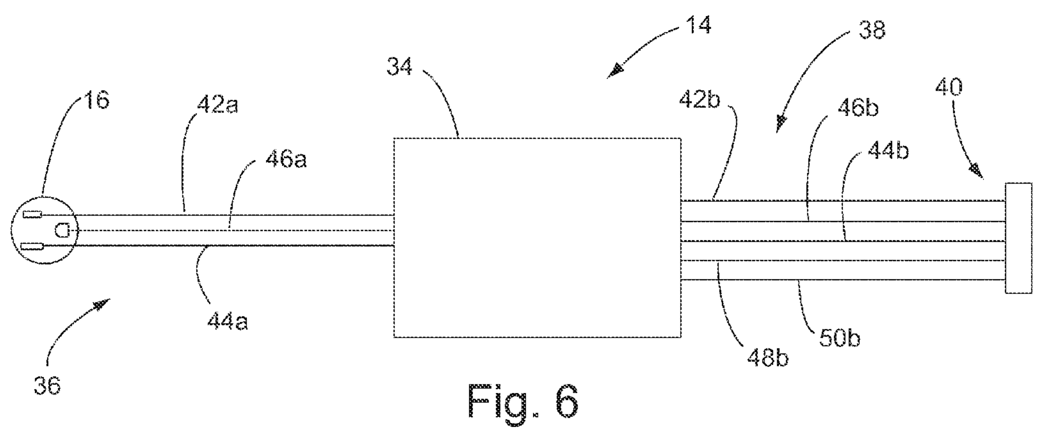
FIG. 6 is a schematic of the wiring that enters and exits the controller of the control unit.

In the illustrated embodiment, power infeed cable 36 includes three power infeed conductors, namely, a "line" or "hot" infeed conductor 42*a*, a neutral infeed conductor 44*a*, and a ground infeed conductor 46*a* (FIG. 6). Power outfeed cable 38 includes three power outfeed conductors, namely a "line" or "hot" outfeed conductor 42*b*, a neutral outfeed conductor 44*b*, and a ground outfeed conductor 46*b* (FIG. 6), which correspond to the respective power infeed conductors 42*a*, 44*a*, and 46*a*. Although three power infeed conductors and three power outfeed conductors are shown, it will be appreciated that in some applications, it may be sufficient to provide only two power conductors throughout the system, or more than three power conductors for other applications. Power outfeed cable 38 further includes first and second outfeed "sense lines" or signal conductors 48*b*, 50*b* that, in the illustrated embodiment, carry a low voltage electrical current, such as about five volts. It should be understood that the signal conductors may be referred to generally herein as "signal conductors 48, 50" without letter suffixes in their reference numerals. In contrast to the relatively low-voltage signal conductors 48*b*, 50*b*, power infeed conductors 42*a*, 44*a*, 46*a* and power outfeed conductors 42*b*, 44*b*, 46*b* are configured to higher voltage electrical current, such as about 110 or 220 volts AC, since this power is selectively supplied to electrical power consumers (appliances, lights, office equipment, etc.) via power outlet modules 28 at the ends of respective outlet feed cables 32.

Figure 6A:
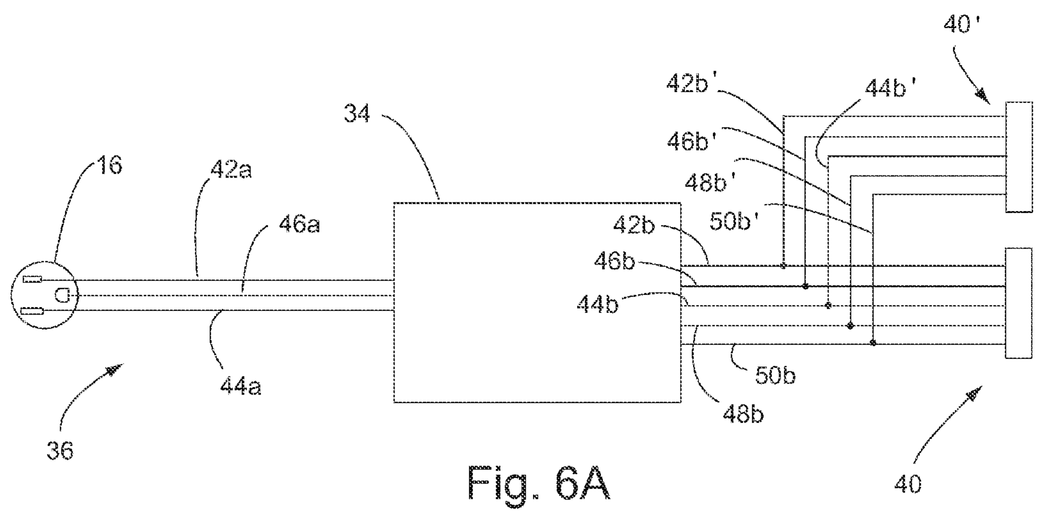
FIG. 6A is a schematic of the wiring that enters and exits the controller of an alternative control unit.

Optionally, and with reference to FIG. 6A, an alternative control unit 14' includes at least one branch power outfeed connector 40' that is supplied with power via a "line" or "hot" branch outfeed conductor 42*b*', a neutral branch outfeed conductor 44*b*', and a ground branch outfeed conductor 46*b*', which correspond and are electrically coupled to outfeed conductors 42*b*, 44*b*, 46*b* of power outfeed cable 38. In addition, branch power outfeed connector 40' is electrically coupled to first and second branch outfeed "sense lines" or signal conductors 48*b*', 50*b*' that correspond and are electrically coupled to outfeed signal conductors 48*b*, 50*b* of power outfeed cable 38. In this manner, one or more power cable assemblies 12 may be coupled to one or more branch power outfeed connectors 40', while one or more additional power cable assemblies 12 are coupled to power outfeed connector 40 of alternative control unit 14', while controller 34 can function in substantially the same way to limit the total number of power cable assemblies 12 that can be electrically coupled to control unit 14', as when all power cable assemblies are coupled to a single power outfeed connector.

Figure 4:
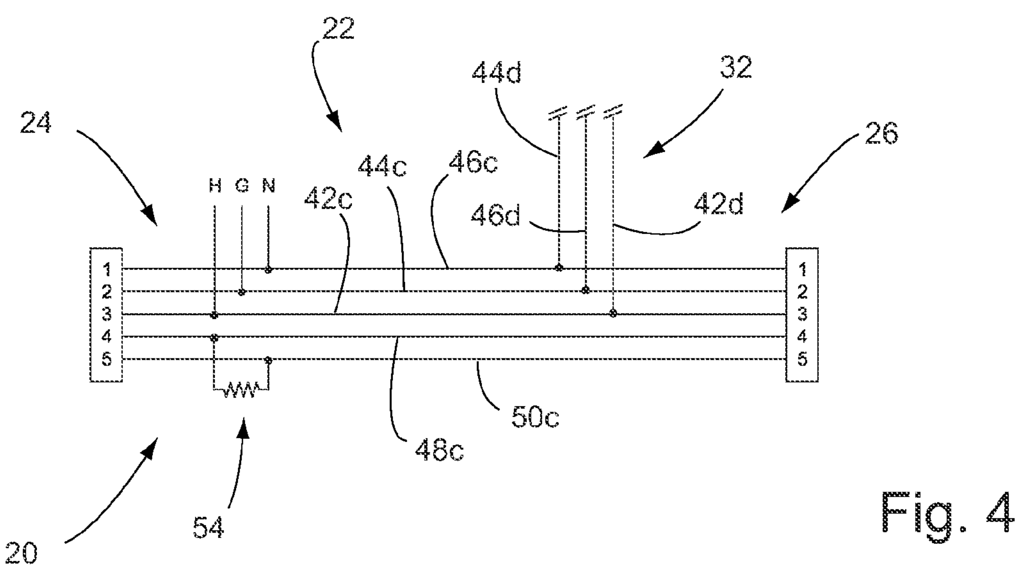
FIG. 4 is a schematic of the wiring for the main power cable subassembly from the power cable assembly of FIGS. 1 and 2.
Figure 5:
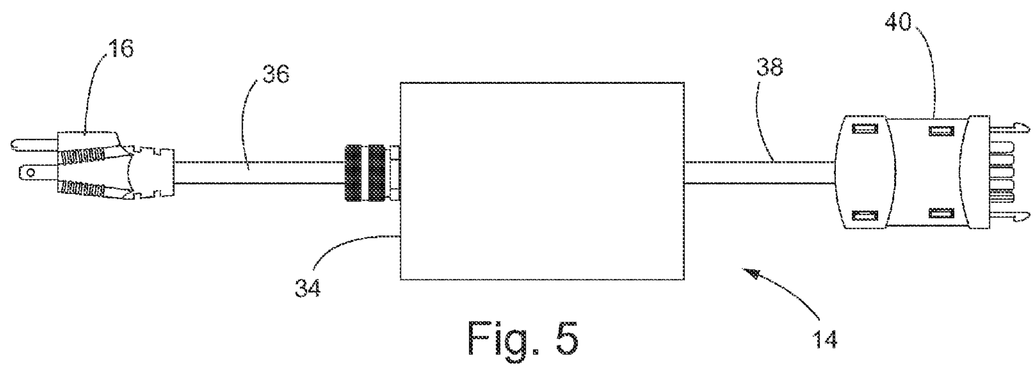
FIG. 5 is a side elevation of the control unit of the electrical distribution system.

Similar to power outfeed cable 38 of control unit 14, each main power cable 22 of each power cable assembly 12 includes a line main conductor 42*c*, a neutral main conductor 44*c*, a ground main conductor 46*c*, a first main signal'conductor 48*c*, and a second main signal conductor 50*c* (FIG. 4). Each of the conductors (42*c*, 44*c*, 46*c*, 48*c*, 50*c*) in the main power cable 22 corresponds and electrically connects to the power outfeed conductors (42*b*, 44*b*, 46*b*, 48*b*, 50*b*) when upstream connector 24 of main power cable subassembly 20 is electrically and mechanically coupled to power outfeed connector 40 of control unit 14. Likewise, each of the conductors (42*c*, 44*c*, 46*c*, 48*c*, 50*c*) in the main power cable 22 of a given power cable assembly 12 corresponds and electrically connects to the corresponding conductors of the other power cable assemblies 12 when adjacent modules 12 are electrically and mechanically coupled together via engagement of downstream connectors 26 (of upstream modules 12) with upstream connectors 24 (of downstream modules 12). Unlike main power cables 22, outlet feed cables 32 each include only a line outlet feed conductor 42*d*, a neutral outlet feed conductor 44*d*, and a ground outlet feed conductor 46*d*, which correspond to and are electrically coupled to the corresponding main conductors (42*c*, 44*c*, 46*c*) of main power cable 22 at downstream connector 26, such as shown in FIG. 4. Thus, outlet feed cables 32 do not include signal conductors. Outlet feed conductors 42*d*, 44*d*, 46*d* are in electrical communication with electrical sockets 52 of power outlet modules 28.

Figures 7, 7A:
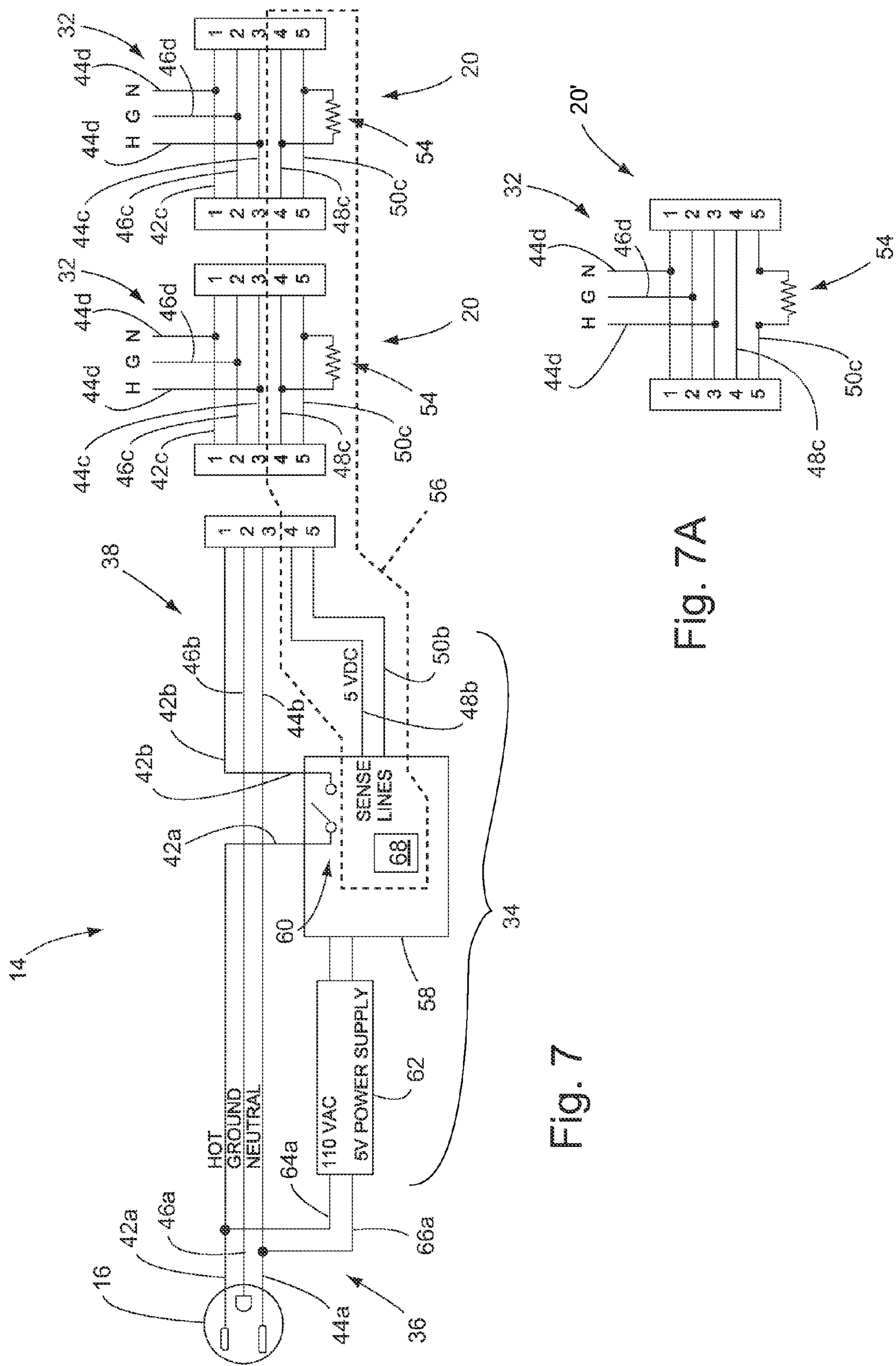
FIG. 7 is a simplified schematic of the control unit and two power cable assemblies.
FIG. 7A is a simplified schematic of an alternative power cable assembly having a resistor connected in series.
Figure 8:
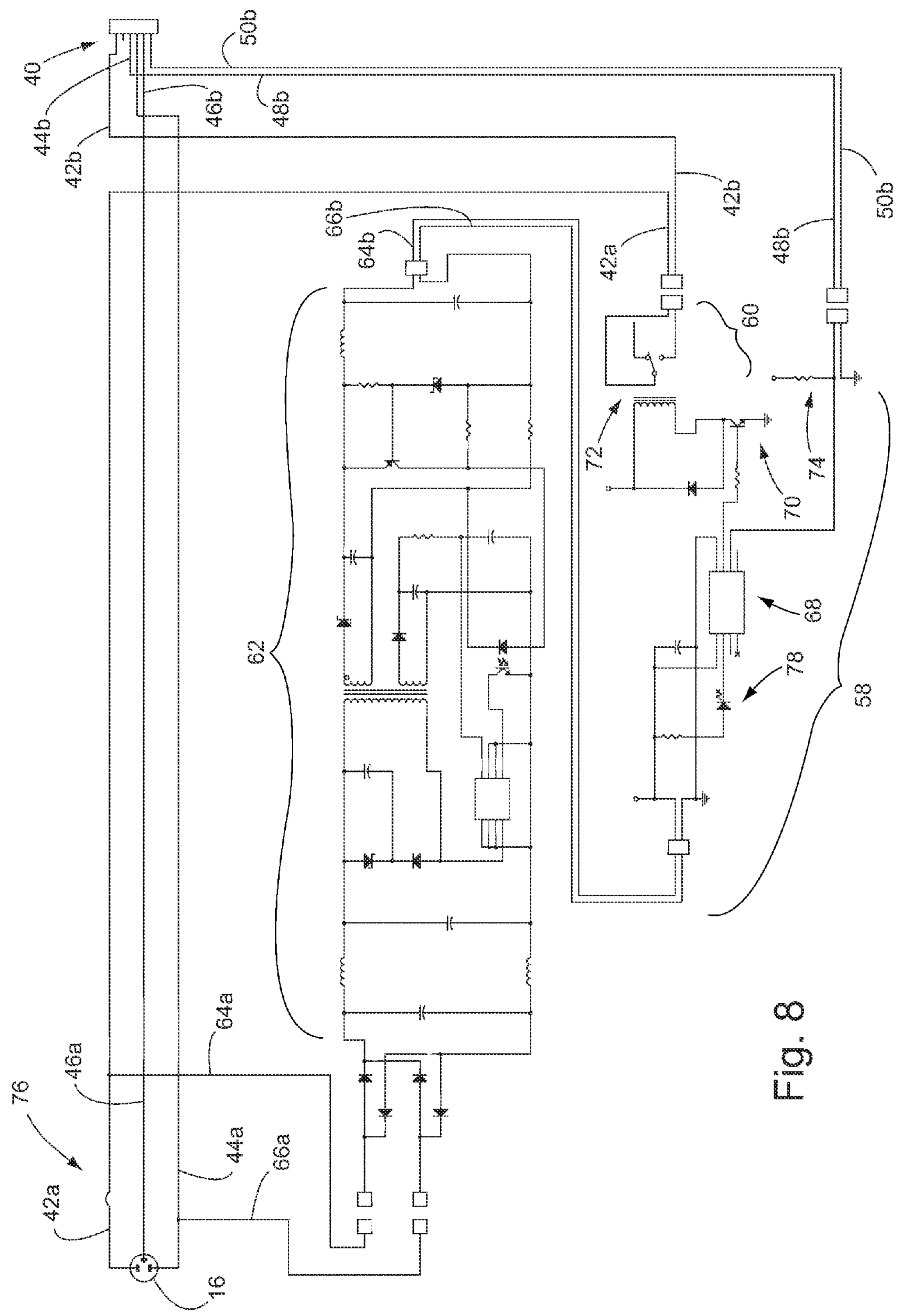
FIG. 8 is a full schematic of the control unit of the electrical distribution system.

An electrical impedance device, such as a resistor 54, is electrically coupled between first main signal conductor 48*c* and second main signal conductor 50*c* and may be positioned substantially anywhere along main power cable subassembly 20, such as along main power cable 22 itself, or in either of upstream connector 24 or downstream connector 26 (FIGS. 4, 7, and 8). Thus, when the main power cable subassemblies 20 of multiple power cable assemblies are coupled together, the electrical resistors 54 are electrically arranged in parallel. Accordingly, when electrical current is applied to the signal conductors 48, 50, the more electrical resistors 54 there are in a sensing circuit 56 that is defined in part by signal conductors 48, 50 (FIG. 7), the lower the overall resistance (and corresponding voltage drop) will be in the sensing circuit 56. Each electrical resistor 54 in each upstream connector 24 of each power cable assembly 12 exhibits substantially the same electrical resistance as the other electrical resistors 54 in the other power cable assemblies, so that the number of power cable assemblies 12 coupled to a given control unit 14 can be calculated or measured by controller 34, with greater voltage in sensing circuit 56 corresponding to a greater number of power cable assemblies 12 connected in series, as will be described below. Although primarily shown and described herein as a "resistor", it should be understood that electrical resistor 54 represents substantially any device or element capable of providing an electrical impedance.

Controller 34 includes a microcontroller 58 that is in communication with first and second outfeed signal conductors 48*b*, 50*b*, and with infeed line conductor 42*a* and outfeed line conductor 42*b*, such as shown in FIG. 7. Microcontroller 58 further includes a relay switch 60 that selectively connects and disconnects outfeed line conductor 42*b* with infeed line conductor 42*a* according to the voltage drop along first and second signal conductors 48, 50, which is sensed or detected by microcontroller 58. In the illustrated embodiment, controller 34 further includes a power converter 62 that receives high-voltage electrical power (such as 110 or 220 volts AC, as shown in FIGS. 7 and 8) via converter infeed conductors 64*a*, 66*a* that are electrically coupled to infeed line conductor 42*a* and outfeed line conductor 44*a* of power infeed cable 36, respectively. Power converter 62 converts the high voltage AC power infeed to a stable lower voltage power outfeed at converter outfeed conductors 64*b*, 66*b*, which supply microcontroller 58 with electrical power (5 volts DC, as shown in FIG. 7). The 5-volt DC power supplied to microcontroller 58 by converter outfeed conductors 64*b*, 66*b* is used to supply 5-volt DC power to signal outfeed conductors 48*b*, 50*b*, as well as to relay switch 60 and to the other circuitry of microcontroller 58, which will be described in more detail below.

A microprocessor 68 in microcontroller 58 completes sensing circuit 56 when combined with first signal conductors 48*b*, 48*c* and second signal conductors 50*a*, 50*b* (FIG. 7). Microprocessor 68 is programmed with a predetermined voltage threshold that corresponds to the maximum number of power cable assemblies 12 that should be permitted to be connected to control unit 14. When no power cable assemblies 12 are connected to the control unit 14, the voltage drop across signal conductors 48, 50 is zero, such that the full 5-volt signal returns to (and is measured by) microprocessor 68. Microprocessor 68 may be programmed to maintain relay switch 60 in an open condition under these circumstances, or may be programmed to close relay switch 60 when no power cable assemblies 12 are connected and the control unit 14 is energized.

When a single power cable assembly 12 is electrically coupled to control unit 14, the voltage drop across signal conductors 48, 50 is at a maximum, which corresponds to a maximum voltage returning to (and being measured by) microprocessor 68 when a voltage divider is used, as described below. This measured voltage will be more than the minimum threshold voltage at which microprocessor 68 will close relay switch 60, and microprocessor 68 will close the switch 60 accordingly, thus applying electrical current to outfeed line conductor 42*b* and energizing the power outlet module 28 associated with the one power cable assembly 12 connected to control unit 14. As additional power cable assemblies 12 are connected to the first power cable assembly, the signal voltage returning to (and being measured by) microprocessor 68 will decrease from its value when only one power cable assembly 12 is connected, as additional resistors 54 are added to sensing circuit 56 in parallel. The signal voltage will exceed a predetermined minimum threshold value when a predetermined number of power cable assemblies 12 have been electrically coupled to control unit 14, and when that point is reached, microprocessor 68 will open relay switch 60 and disconnect power from outfeed line conductor 42*b*, which effectively de-energizes the power cable assemblies 12.

In the illustrated embodiment, relay switch 60 defaults to an open-circuit condition in which there is no electrical continuity between line infeed conductor 42*a* and line outfeed conductor 42*b*, such as shown in FIG. 7. Only when microprocessor 68 detects that the signal voltage across signal conductors 48, 50 is below a maximum threshold value will microprocessor actuate the relay switch 60 to establish electrical continuity between line infeed conductor 42*a* and line outfeed conductor 42*b*, thus energizing the power cable assemblies 12 that are coupled to control unit 14. Power outfeed connector 40 may be energized even if no power cable assemblies 12 are coupled thereto, although this is not required, and it is envisioned that power outfeed connector 40 may be energized by controller 34 only if at least one power cable assembly 12 is connected thereto. Thus, power cable assemblies 12 will not be electrically energized unless the number of power cable assemblies connected to control unit 14 is less than or equal to a predetermined maximum allowable number of power cable assemblies. For example, if the maximum allowable number of power cable assemblies is eight, eight power cable assemblies are already coupled to a given control unit 14, and a user connects a ninth power cable assembly, microprocessor 68 will open relay switch 60 to de-energize all of the power cable assemblies 12 simultaneously. By further example, if a given control unit 14 is electrically coupled to more than the maximum allowable number of power cable assemblies, but is not yet connected to an electrical power source, connecting the control unit 14 to a power source will not energize the power cable assemblies, even momentarily, because relay switch 60 defaults to an open condition, and microprocessor 68 will not signal relay switch 60 to close once control unit 14 is energized because the microcontroller will have detected that the number of power cable assemblies exceeds the maximum allowable number. In addition, control unit 14 may be configured so that it must be disconnected from its power source and then reconnected to "reset" the controller 34, if a user has previously connected too many power cable assemblies 12 so that controller 34 has opened relay switch 60. This arrangement provides fail-safe features in that the power cable assemblies 12 will only be energized if the controller acts to close relay switch 60, which otherwise defaults to an open position. In some embodiments, however, it is envisioned that the relay switch could be configured to default to a closed position, if desired.

It will be appreciated that instead of arranging the electrical resistor in each power cable assembly in parallel, as shown and described above, an alternative main power cable subassembly 20' (FIG. 7A) may include an electrical resistor 54 (or substantially any other device or element providing an electrical impedance) that is arranged in-line with one of the signal conductors, such as signal conductor 50*c*, so that the resistors of adjacent connected power cable subassemblies 20' are arranged in series, and the number of power cable subassemblies 20' coupled to a given control unit 14 can thus be calculated or measured by the controller, with lower voltage in the sensing circuit corresponding to a greater number of power cable assemblies connected in series. In this arrangement of resistors in series, however, it will be appreciated that a switching device or other element would be used to close the sensing circuit regardless of the number of power cable assemblies 12 that are coupled together.

Referring now to FIG. 8, additional detail is provided for the circuitry of electrical power distribution system 10. Power converter 62 is a substantially conventional design for converting 110 volt or 220 volt AC input power (or other relatively high-voltage input power) to 5 volt DC output power (or other relatively low-voltage output power), as is known in the art. Relay switch 60 includes a switching transistor 70 and a single-pole voltage-protected relay 72. Microprocessor 68 receives a voltage signal from a voltage divider 74, and utilizes analog-to-digital conversion to determine whether the signal voltage has exceeded (i.e. passed above or below) the maximum or minimum allowable voltage for maintaining relay switch 60 in an open configuration. One suitable microprocessor 68 is Model No. PIC12F675 8-bit CMOS microcontroller, available from Microchip Technology Inc. of Chandler, Ariz. The open/close signal is supplied to the switching transistor 70, which energizes or de-energizes relay 72 to close or open relay switch 60 accordingly. Optionally, the threshold voltage can be varied according to the maximum allowable desired number of power cable assemblies. The threshold voltage at which microprocessor 68 will open relay switch 60 is typically set by the manufacturer, although it is envisioned that in some embodiments the microprocessor could be reprogrammed in the field, if needed. Optionally, the microprocessor may be capable of a providing a "counting" function in which the microprocessor detects the number of power cable assemblies that are coupled to the control unit 14, such as by correlating the voltage through voltage divider 74 to a specific integer number. A circuit breaker 76 is provided along infeed line conductor 42*a* and will disconnect power to controller 34 and to power cable assemblies 12 if the current draw in system 10 exceeds a maximum threshold, regardless of the number of power cable assemblies 12 that are electrically connected in the system. Thus, as long as relay switch 60 is closed, controller 34 provides a stable, energy-efficient selective power supply with substantially constant current and constant voltage power output to power out let assemblies 28 of power cable assemblies 12.

Optionally, and in the illustrated embodiment of FIG. 8, microcontroller includes a signal light 78 (such as an LED or the like), which can be positioned along an outer surface of controller 34. In the illustrated embodiment, signal light 78 is illuminated only when relay switch 60 is closed, thereby signaling to users that power cable assemblies 12 that are connected to control unit 14 are electrically energized. However, it is envisioned that multiple signal lights, or multi-color signal lights, may be used to signal different operating conditions of electrical power distribution system 10. For example, a single red/green LED signal light could be used to indicate whether (i) control unit 14 is energized but relay switch 60 is open and thus any power cable assemblies 12 that are coupled to the control unit 14 are not energized (red light), (ii) control unit 14 is energized and relay switch 60 is closed to energize power cable assemblies 12 (green light), or (iii) control unit 14 is not energized and so neither are power cable assemblies 12 (no light).

Thus, the electrical power distribution system of the present invention permits a user to add and remove power cable assemblies in the system in an interchangeable manner, according to the number of power cable assemblies desired for a given application, but will not energize the power cable assemblies if their number exceeds a predetermined threshold number, regardless of the amount of electrical current demand that is actually placed on the system. The control unit receives electrical power from a power source, and all of the power cable assemblies in the distribution system associated with that control unit are energized through the control unit, as long as the control unit detects that the number of power cable assemblies does not exceed a predetermined or selectable number of modules. Thus, the system operates to help ensure that the number of power cable assemblies connected in series does not exceed a safe number, independent of the actual current draw on the system. This allows users to connect multiple power cable assemblies to a single power source without the inconvenience of coupling different power cable assemblies in a specific order, while maintaining safety and code compliance.

Changes and modifications in the specifically described embodiments can be carried out without departing from the principles of the present invention which is intended to be limited only by the scope of the appended claims, as interpreted according the principles of patent law, including the doctrine of equivalents.

The embodiments of the invention in which an exclusive property or privilege is claimed are defined as follows:

1. An electrical power distribution system comprising:

at least one power outlet receptacle;

at least one power cable assembly comprising (i) a main power cable subassembly having at least two power conductors, at least two signal conductors, and first and second electrical connectors at opposite end portions of said main power cable subassembly, (ii) an electrical impedance element electrically coupled to at least one of said signal conductors, and (iii) an outlet feed cable configured to be electrically coupled to said power outlet receptacle and to said power conductors in said main power cable sub assembly;

a control unit in electrical communication with said power conductors and said signal conductors of said main power cable subassembly, said control unit comprising an electrical switch associated with at least one of said power conductors and operable to selectively prevent a flow of electricity through said power conductors, and a controller in electrical communication with said signal conductors and said electrical switch;

wherein said controller is operable to detect a number of main power cable subassemblies coupled together in said electrical power distribution system by measuring a voltage in said signal conductors, and wherein said control unit is operable to close said electrical switch so as to permit a flow of electricity through said at least two power conductors when the number of main power cable subassemblies in said electrical power distribution system is detected by said controller as being less than or equal to a predetermined number.

2. The electrical power distribution system of claim 1, wherein said main power cable subassembly comprises at least three power conductors including a line conductor, a neutral conductor, and a ground conductor.

3. The electrical power distribution system of claim 1, wherein said electrical impedance element comprises an electrical resistor.

4. The electrical power distribution system of claim 1, wherein said electrical impedance element is disposed in one of said first and second electrical connectors of said main power cable subassembly.

5. The electrical power distribution system of claim 1, wherein said controller comprises an electrical converter in electrical communication with said at least two power conductors and with said signal conductors, said electrical converter configured to convert a relatively higher voltage electrical power to a relatively lower voltage electrical power that is applied to said signal conductors.

6. The electrical power distribution system of claim 1, wherein said outlet feed cable comprises at least two power feed conductors that are electrically coupled to respective ones of said at least two power conductors of said main power cable subassembly at said first electrical connector, and wherein said outlet feed cable does not include any electrical conductors in communication with said signal conductors of said main power cable subassembly.

7. The electrical power distribution system of claim 6, wherein said power outlet receptacle is a pop-up power outlet receptacle that is configured to be supported in a recess at a work surface.

8. The electrical power distribution system of claim 1, wherein said first electrical connector is configured to mechanically and electrically couple said at least two power conductors and said signal conductors of a first of said main power cable subassemblies with said at least two power conductors and said signal conductors at said second electrical connector of a second of said main power cable subassemblies.

9. The electrical power distribution system of claim 1, wherein said control unit comprises first and second power outfeed cables, each power outfeed cable comprising a plurality of power outfeed conductors and at least two outfeed signal conductors that are simultaneously electrically connectable to respective ones of said power conductors and said signal conductors of a different one of said power cable assemblies.

10. An electrical power distribution system comprising:

at least one power cable assembly comprising a main power cable subassembly having a plurality of power conductors that are electrically connectable to an electrical power source, at least two signal conductors, and an electrical impedance element electrically coupled to at least one of said signal conductors, said main power cable subassembly having opposite end portions with each end portion having a respective electrical connector, and said power cable assembly further comprising an outlet feed cable;

a control unit in electrical communication with said power conductors and said signal conductors of said at least one power cable assembly, said control unit comprising an electrical switch associated with at least one of said power conductors and operable to selectively energize and de-energize at least one of said power conductors, and a controller in electrical communication with said signal conductors and said electrical switch; and wherein said controller is operable to measure a voltage drop across said signal conductors, and wherein said controller is further operable to close said electrical switch so as to permit a flow of electricity through said power conductors when the number of main power cable subassemblies in said electrical power distribution system is detected by said controller as being less than or equal to a predetermined number.

11. The electrical power distribution system of claim 10, wherein said control unit comprises an electrical converter in electrical communication with said signal conductors and with said electrical power conductors that receive electrical power from the power source, said electrical converter configured to convert a relatively higher voltage electrical power to a relatively lower voltage electrical power applied to said signal conductors.

12. The electrical power distribution system of claim 10, wherein said outlet feed cable comprises at least two power feed conductors that are electrically coupled to respective ones of said power conductors of said main power cable subassembly at one of said electrical connectors.

13. The electrical power distribution system of claim 12, wherein said one of said electrical connectors is configured to mechanically and electrically couple said power conductors and said signal conductors with said power conductors and said signal conductors at a second electrical connector of another of said main power cable subassemblies.

14. The electrical power distribution system of claim 10, wherein said power outlet receptacle is a pop-up power outlet receptacle that is configured to be supported at a work surface.

15. The electrical power distribution system of claim 10, wherein at least one of said cable assembly and said control unit is configured to be positioned substantially below a work surface.

16. The electrical power distribution system of claim 10, further in combination with a work surface.

17. An electrical power distribution system comprising:

a plurality of power outlet modules, at least one of said power outlet modules having a power outlet receptacle;

a plurality of power cable assemblies interconnected in a chain with an upstream one of said power cable assemblies electrically connected with a control unit, each of said power cable assemblies comprising (i) a main power cable subassembly having at least two power conductors, at least two signal conductors, and first and second electrical connectors at opposite end portions of said main power cable subassembly, each of said connectors adapted to connect with one of said connectors of an adjacent one of said power cable assemblies, (ii) an electrical impedance element electrically coupled to at least one of said signal conductors in one of said first and second electrical connectors, and (iii) an outlet feed cable comprising at least two power feed conductors that are electrically coupled to respective ones of said at least two power conductors of said main power cable subassembly at said first electrical connector, wherein said outlet feed cable is configured to be electrically coupled to one of said power outlet modules and to said power conductors in said main power cable subassembly, and wherein said power outlet modules do not include any electrical conductors in communication with said signal conductors of said main power cable subassemblies;

said control unit in electrical communication with said power conductors and said signal conductors of said main power cable subassembly, said control unit comprising (i) an electrical switch associated with at least one of said power conductors and operable to selectively prevent a flow of electricity through said power conductors, and (ii) a controller in electrical communication with said signal conductors and said electrical switch, said controller comprising an electrical converter in electrical communication with said signal conductors to apply a low voltage signal to said signal conductors;

wherein said controller further includes a voltage sensor in electrical communication with said signal conductors, wherein said voltage sensor is operable to detect a number of main power cable subassemblies coupled together in said electrical power distribution system by measuring a voltage in said signal conductors, and wherein said control unit is operable to close said electrical switch so as to permit a flow of electricity through said at least two power conductors when the number of main power cable subassemblies in said electrical power distribution system is detected by said controller as being less than or equal to a predetermined number.

18. The electrical power distribution system of claim 17, wherein said control unit comprises first and second power outfeed cables, each power outfeed cable comprising a plurality of power outfeed conductors and at least two outfeed signal conductors that are simultaneously electrically connectable to respective ones of said power conductors and said signal conductors of a different one of said power cable assemblies.

19. The electrical power distribution system of claim 17, wherein said power outlet module comprises a pop-up power outlet receptacle that is configured to be supported in a recess at a work surface.

20. The electrical power distribution system of claim 19, wherein at least one of said cable assembly and said control unit is configured to be positioned substantially below a work surface.

* * * * *

UNITED STATES PATENT AND TRADEMARK OFFICE

CERTIFICATE OF CORRECTION

PATENT NO. : 8,350,406 B2
APPLICATION NO. : 13/449701
DATED : January 8, 2013
INVENTOR(S) : Norman Byrne It is certified that error appears in the above-identified patent and that said Letters Patent is hereby corrected as shown below:

In the Specification

Column 4
Line 33, “19” should be --12--

Column 5
Line 59, insert --carry a-- after “configured to”

Column 6
Line 21, “signal'conductor” should be --signal conductor--

Signed and Sealed this
Twenty-ninth Day of September, 2015

Michelle K. Lee
*Director of the United States Patent and Trademark Office*